(12) United States Patent
Teng et al.

(10) Patent No.: US 7,248,202 B2
(45) Date of Patent: Jul. 24, 2007

(54) FINGER FEELING NUMERICAL BUTTONS FOR COMMERCIAL ELECTRONIC REMOTE CONTROL

(76) Inventors: Ching Shih Teng, 5F, No.6, Lane79, Shioufeng Street, Junghe City, Taipei Hsien 235 (TW); Nai-You Teng, 5F, No.6, Lane79, Shioufeng Street, Junghe City, Taipei Hsien 235 (TW)

( * ) Notice: Subject to any disclaimer, the term of this patent is extended or adjusted under 35 U.S.C. 154(b) by 188 days.

(21) Appl. No.: 11/201,833

(22) Filed: Aug. 10, 2005

(65) Prior Publication Data

US 2007/0035418 A1 Feb. 15, 2007

(51) Int. Cl.
*G08C 19/12* (2006.01)
(52) U.S. Cl. ................... 341/176; 379/433.07; 400/488
(58) Field of Classification Search .................. 431/22, 431/176; 400/488, 491.3; 379/433.07; 345/168
See application file for complete search history.

(56) References Cited

U.S. PATENT DOCUMENTS

| | | | | |
|---|---|---|---|---|
| 4,180,336 A | * | 12/1979 | Lonsdale | ................. 400/491.3 |
| 4,597,681 A | * | 7/1986 | Hodges | ...................... 400/488 |
| 6,940,490 B1 | * | 9/2005 | Kim et al. | ................... 345/168 |
| 6,941,125 B2 | * | 9/2005 | Montague | ................ 455/404.1 |

* cited by examiner

*Primary Examiner*—Timothy Edwards, Jr.
(74) *Attorney, Agent, or Firm*—Perkins Coie LLP

(57) ABSTRACT

The present invention offers a finger feeling numerical buttons for commercial electronic remote control. The altitude of the five even number buttons 0,2,4,6 and 8 is higher than the altitude of the other buttons 1,3,7,9, * and #. On the upper, lower, right and left side of the central button 5, provides a feeling mark, so that as the user touch the central button and the higher buttons with his thumb, the position of every button can be identified. Remote control can be carried out without watching at the button. This is suitable for various remote controls such as a TV set, cellular phone and remote control of a car.

4 Claims, 3 Drawing Sheets

FINGER FEELING NUMERICAL BUTTONS FOR COMMERCIAL ELECTRONIC REMOTE CONTROL

BACKGROUND OF THE INVENTION

1. Field of the Invention

The present invention relates to numerical buttons for commercial electronic remote control. In particular, the present invention relates to buttons with two groups of different altitude, so that the user can control the buttons by their feeling of his finger without watching at the buttons.

2. Description of the Related Art

The 10 numerical buttons of the modern cellular phone or TV controller is used by watching at the number of the buttons before pressing the button. This is not convenient for an old man with weak sight or a car driver concentrating his attention on driving.

The 10 numerical buttons of the cellular phone or TV remote controller are arranged to form three rows, each row has three numbers, they are 1,2,3; 4,5,6; and 7,8,9. The 0 number-button is on the center of the $4^{th}$ row. As shown in FIG. 1. FIG. 1 is a schematic representation of the numerical buttons of the prior art. The controller 100 of a cellular phone or a TV set has all the buttons with the same altitude. The user must watch at the number before pressing the button. This is not convenient for a user who is driving or watching the TV.

The button of a car remote controller may be designed to have different shape, such as triangular, round shape star form, etc., although the shapes can be identified by his sight more easily, but still can not feel by the feeling of his finger. Moreover, too much different shapes are more difficult to identify, and error may occur more frequently.

The present invention provides a finger feeling button for electrical remote control to overcome the disadvantage of the prior art, such that controlling the controller is more convenient.

OBJECTS OF THE INVENTION

It is therefore an object of the invention to provide a finger feeling numerical buttons for electrical remote control, by implementing two groups of different altitude buttons so that the position of the buttons can be identified by touching the center button and feeling the higher even buttons.

It is another object of the invention to provide a finger feeling numerical buttons for electrical remote control, by implementing two groups of different altitude buttons so that the user need not watching at the buttons, thus increases the safety of a driver who is driving.

DISCLOSURE OF THE INVENTION

In order to achieve the above and other objects, a first aspect of the present invention teaches a finger feeling numerical buttons for electrical remote control, by increasing the altitude of the 0 and the four even numerical buttons of the ten numbers, so that the user can make use of the feeling of one's finger by feeling the five higher buttons and the six lower buttons and the center button (5) with four small feeling marks to identify the position of every button, by making the altitude of the numerical buttons 1,3,5,7,9 and *, # are keep in regular altitude; the altitude of the numerical buttons 0,2,4,6,8 are increased to two times altitude; on the upper, lower, right and left of the surface of the numerical button 5, there are four small feeling marks.

Another preferred embodiment of the present invention teaches a finger feeling numerical buttons for electrical remote control, by increasing the altitude of 0 and five odd numerical buttons of the ten numbers, so that the user can make use of the feeling of one's finger by feeling the six higher buttons and the six lower buttons and the center button (5) with four small feeling marks to identify the position of every button, by making the altitude of the numerical buttons 2,4,6,8 and *, # are keep in regular altitude; the altitude of the numerical buttons 0,1,3,5,7,9 are increased to two times altitude; on the upper, lower, right and left of the surface of the numerical button 5, there are four small feeling marks.

BRIEF DESCRIPTION OF THE DRAWINGS

The foregoing and other advantages of the invention will be more fully understood with reference to the description of the best embodiment and the drawing wherein.

DESCRIPTION OF THE PREFERRED EMBODIMENTS

Figure 1:
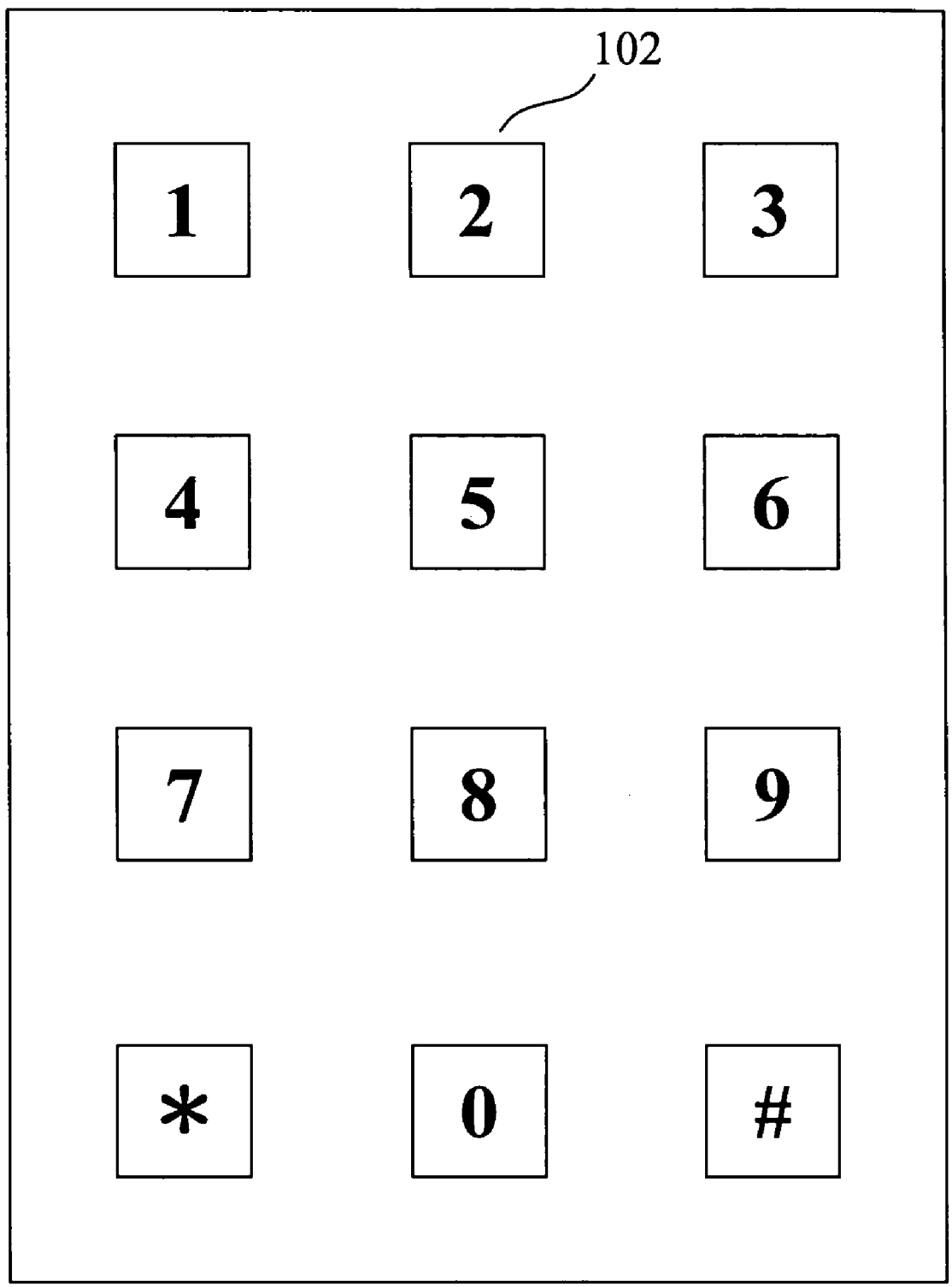
FIG. 1 is a schematic representation of the numerical buttons of the prior art.

The foregoing and other advantages of the invention will be more fully understood with reference to the description of the best embodiment and the drawing as the following description.

Figure 2:
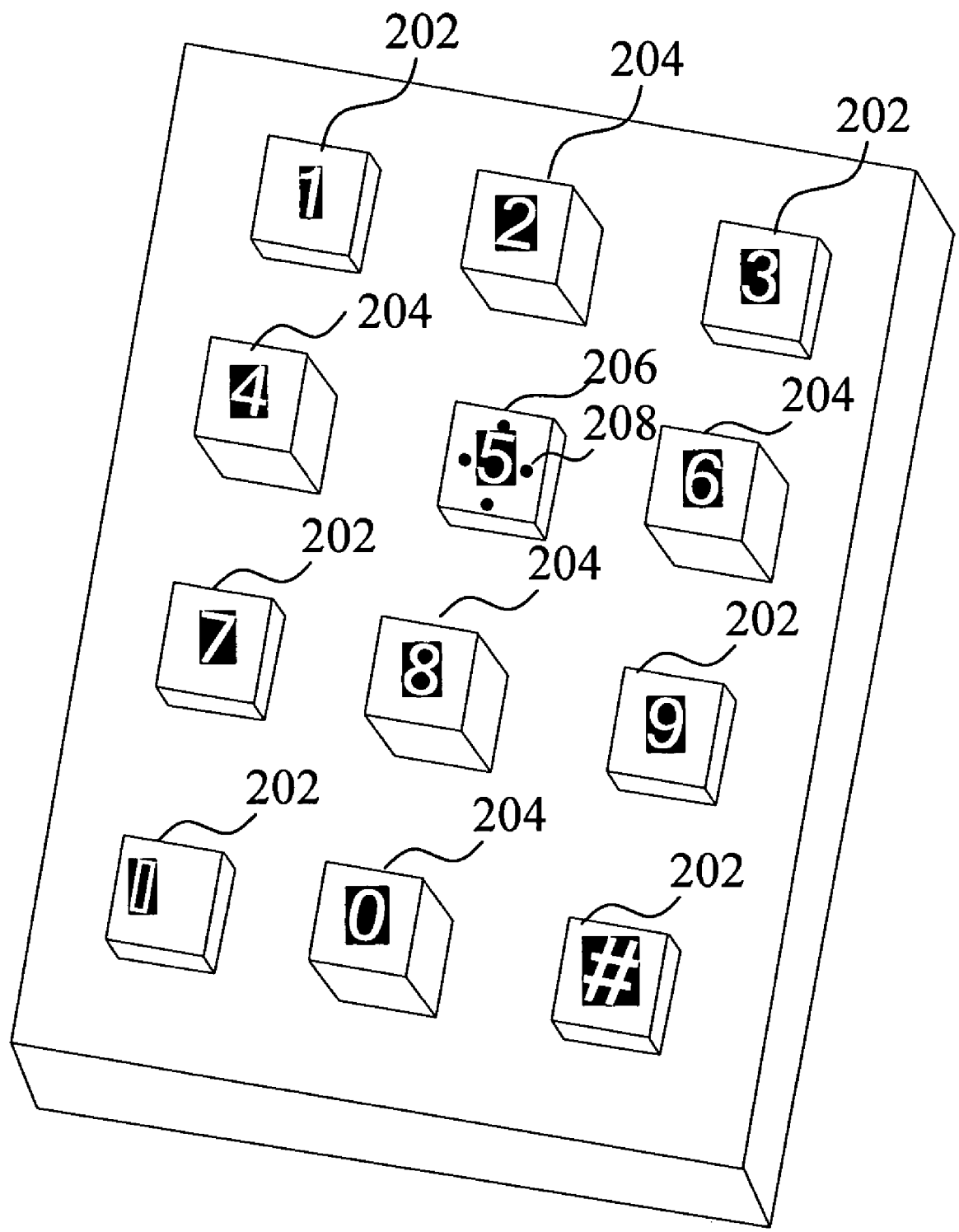
FIG. 2 illustrates a perspective drawing of the finger feeling numerical buttons for electrical remote controller in according to one embodiment of the present invention.

Refer to FIG. 2. FIG. 2 illustrates a perspective drawing of the finger feeling numerical buttons for electrical remote controller in according to one embodiment of the present invention. The altitude of the odd numerical buttons 1,3,5, 7,9 and *, # (202) are keep in regular altitude, The altitude of the even numerical buttons 2,4,6,8 (204) are increased to two times altitude, on the upper, lower, right and left of the surface of the numerical button 5 (206), there are four small feeling marks (208). The controller is operating by putting ones thumb (or other finger) on the numerical button 5 (206), the relative position of the button are: upper left is the lower button 1, the upper is the higher button 2, the upper right is the lower button 3, the left is the higher button 4, the center is the lower button 5, the lower left is the lower button 7, the lower is the higher button 8, the lower right is the lower button 9, the center of the $4^{th}$ row is the higher button 0. The numerical buttons are selected by the feeling of one's thumb and watching is not necessary.

Figure 3:
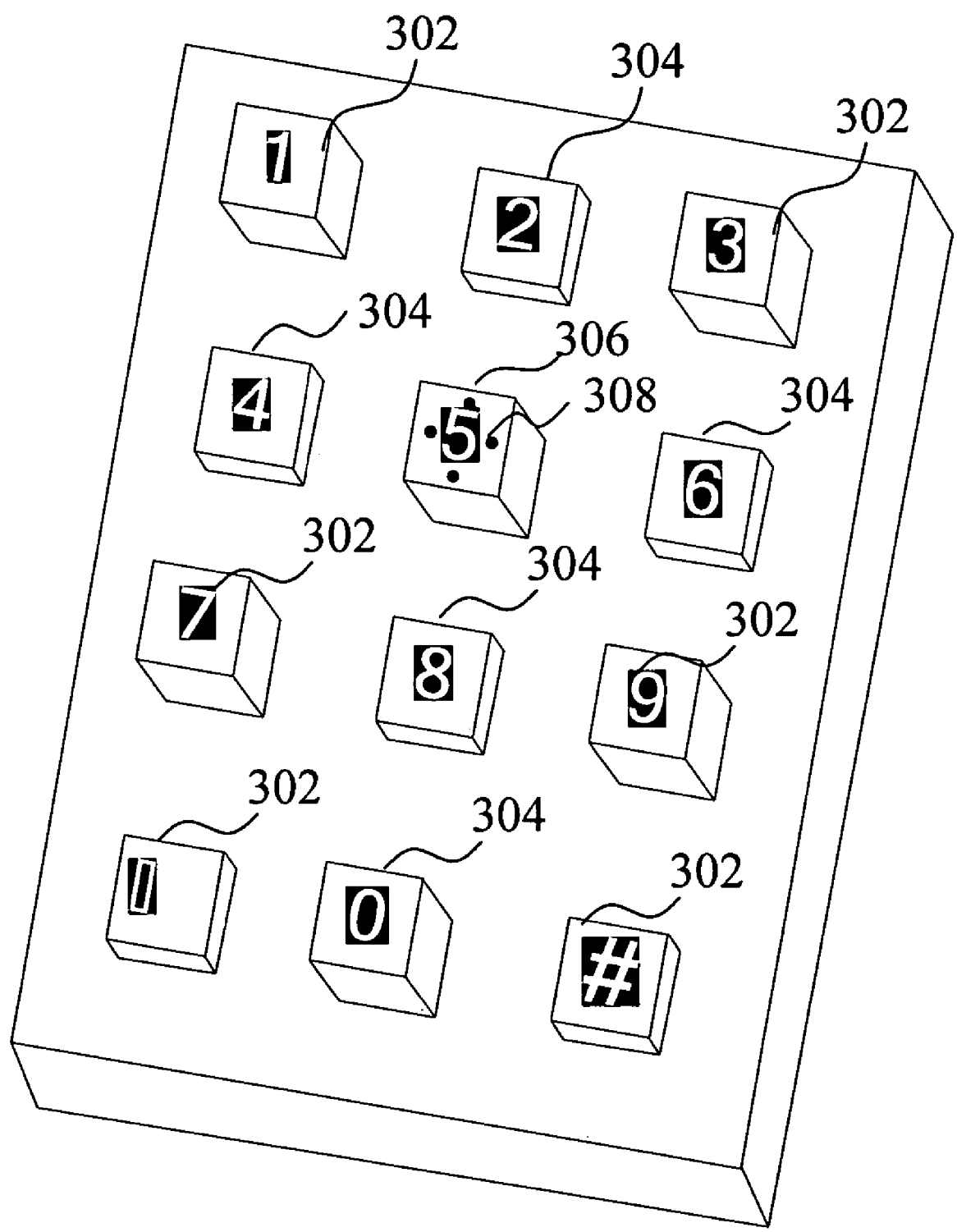
FIG. 3 illustrates a perspective drawing of the finger feeling numerical buttons for electrical remote controller in according to another embodiment of the present invention.

Refer to FIG. 3. FIG. 3 illustrates a perspective drawing of the finger feeling numerical buttons for electrical remote controller in according to another embodiment of the present invention. The altitude of the even numerical buttons 2,4,6,8 and *, # (304) are keep in regular altitude, The altitude of the odd numerical buttons 1,3,5,7,9 and 0 (302) are increased to two times altitude, on the upper, lower, right and left of the surface of the numerical button 5 (306), there are four small feeling marks (308). The controller is operating by putting ones thumb (or other finger) on the numerical button 5 (306), the relative position of the button are: upper left is the higher button 1, the upper is the lower button 2, the upper right is the higher button 3, the left is the lower button 4, the center is the lower button 5, the lower left is the higher button 7, the lower is the lower button 8, the lower right is the higher button 9, the center of the 4$^{th}$ row is the higher button 0. The numerical buttons are selected by the feeling of one's thumb and watching is not necessary.

Although specific embodiments of the invention have been disclosed, it will be understood by those having skill in the art that minor changes can be made to the form and details of the specific embodiments disclosed herein, without departing from the scope of the invention. The embodiments presented above are for purposes of example only and are not to be taken to limit the scope of the appended claims.

What is claimed is:

1. A finger feeling numerical buttons for electrical remote control, by increasing the altitude of the0 and the four even numerical buttons of the ten numbers, so that the user can make use of the feeling of one's finger by feeling the five higher buttons and the six lower buttons and the center button (5) with four small feeling marks to identify the position of every button, comprising:

the altitude of the numerical buttons 1,3,5,7,9 and *, # are keep in regular altitude;

the altitude of the numerical buttons 0,2,4,6,8 are increased to two times altitude;

on the upper, lower, right and left of the surface of the numerical button 5, there are four small feeling marks.

2. A finger feeling numerical buttons for electrical remote control, by increasing the altitude of 0 and four odd numerical buttons of the ten numbers, so that the user can make use of the feeling of one's finger by feeling the six higher buttons and the six lower buttons and the center button (5) with four small feeling marks to identify the position of every button, comprising:

the altitude of the numerical buttons 2,4,6,8 and *, # are keep in regular altitude;

the altitude of the numerical buttons 0,1,3,5,7,9 are increased to two times altitude;

on the upper, lower, right and left of the surface of the numerical button 5, there are four small feeling marks.

3. A finger feeling numerical buttons for electrical remote control as recited in claim 2, wherein said small feeling marks are beetle mark.

4. A finger feeling numerical buttons for electrical remote control as recited in claim 3, wherein said small feeling marks are indentation mark.

* * * * *